(12) United States Patent
LaRocca

(10) Patent No.: US 6,181,926 B1
(45) Date of Patent: *Jan. 30, 2001

(54) INTEGRATED VOICE MAIL SYSTEM FOR CDMA NETWORK

(75) Inventor: Peter LaRocca, Del Mar, CA (US)

(73) Assignee: Qualcomm Incorporated, San Diego, CA (US)

( * ) Notice: Under 35 U.S.C. 154(b), the term of this patent shall be extended for 0 days.

This patent is subject to a terminal disclaimer.

(21) Appl. No.: 09/491,058

(22) Filed: Jan. 25, 2000

Related U.S. Application Data

(63) Continuation of application No. 08/806,980, filed on Feb. 26, 1997.

(51) Int. Cl.[7] .......................... H04M 11/10; H04B 7/216
(52) U.S. Cl. .......................... 455/413; 455/412; 370/342
(58) Field of Search .................................. 455/413, 412; 379/88.22, 88.25, 88.26; 370/342, 428

(56) References Cited

U.S. PATENT DOCUMENTS

| | | | |
|---|---|---|---|
| 5,134,647 | * 7/1992 | Pugh et al. | 379/88.22 |
| 5,418,835 | * 5/1995 | Frohman et al. | 455/413 |
| 5,423,079 | * 6/1995 | Namiki et al. | 455/410 |
| 5,751,794 | * 5/1998 | Kugell et al. | 379/88.22 |
| 5,884,160 | * 3/1999 | Kanazaki | 455/413 |
| 6,064,876 | * 5/2000 | Ishida et al. | 455/412 |
| 6,069,888 | * 5/2000 | LaRocca | 370/342 |

FOREIGN PATENT DOCUMENTS

| | | |
|---|---|---|
| 0332345 | 9/1989 | (EP) . |
| 9300778 | 1/1993 | (WO) . |
| 9504424 | 2/1995 | (WO) . |
| 9522817 | 8/1995 | (WO) . |
| 9623297 | 8/1996 | (WO) . |

OTHER PUBLICATIONS

Yasuda et al, "Network Functions for the Application of Multi-Rate Speech Coding in Digital Cellular Systems", IEEE Conf 44: 306–310; Jun. 8, 1994.

Uebayashi et al, "Development of TDMA Cellular Base Station Equipment" IEEE (Conf 42) 566–569; May 10, 1992.

* cited by examiner

*Primary Examiner*—Dwayne D. Bost
*Assistant Examiner*—Erika A. Gary
(74) *Attorney, Agent, or Firm*—Philip R. Wadsworth; Thomas R. Rouse

(57) ABSTRACT

A voice mail system is provided in a CDMA wireless telephone system in which a base station controller (BSC) stores, in a encoded format, voice data transmitted by a wireless telephone to a receiving telephone, either wireless or fixed telephone, when the receiving telephone does not "pick up". Also, the base station controller encodes and then stores voice data that is transmitted by a fixed telephone to a wireless telephone when the wireless telephone does not "pick up". In either case, to retrieve voice mail the intended recipient can access the voice mail from a fixed telephone, in which case the voice mail is decoded at the BSC and then sent to the fixed telephone via a landline. Alternatively, the intended recipient can access the voice mail from a wireless telephone in the system, in which case the voice mail is not decoded at the BSC, but is transmitted directly to the wireless telephone, where the message is decoded. In any case, the voice mail undergoes only a single encoding/decoding process, thereby improving the sound quality of the retrieved voice mail messages compared to systems in which tandem vocoding occurs.

2 Claims, 3 Drawing Sheets

INTEGRATED VOICE MAIL SYSTEM FOR CDMA NETWORK

CROSS REFERENCE

This is a continuation application of Application Ser. No. 08/806,980, filed Feb. 6,1997, now allowed, entitled "Integrated Voice Mail System For CDMA Network."

FIELD OF THE INVENTION

The present invention relates generally to wireless telephone systems, and more particularly to voice mail systems for CDMA wireless telephone systems.

DESCRIPTION OF THE RELATED ART

Voice mail systems are ubiquitous in modern telephone systems, including wireless telephone systems. In the wireless telephone context, however, current voice mail systems can degrade recorded messages, because the recorded messages are encoded and decoded multiple times.

More particularly, in the context of code division multiple access (CDMA) wireless telephone systems, a transmitting telephone encodes voice signals using a vocoder, prior to transmitting the signals over the air. A preferred CDMA system is described in U.S. Pat. Nos. 4,901,307 and 5,103,459, both of which are assigned to the same assignee as is the present invention and both of which are incorporated herein by reference. Also, a preferred vocoder is disclosed in U.S. Pat. No. 5,414,796, which is also assigned to the same assignee as is the present invention and which is incorporated herein by reference.

When a person attempts to call a wireless station user from a landline telephone, the call is routed through a public switch telephone network (PSTN). The PSTN connects the call to a base station controller (BSC) which controls the operation of a plurality of base stations that serve a common geographic area. When it receives the call from the PSTN or another wireless telephone, the BSC determines whether the recipient wireless telephone is currently registered with any base station. If the wireless telephone is not registered (or it is registered but it does not pick up), the call is directed to a voice mail system that encodes and stores a voice message intended for the recipient wireless telephone user.

Subsequently, the wireless telephone user can access the voice mail system to retrieve the message, at which time the message is decoded and sent to the BSC. At the BSC, the message is once again encoded, then sent to a base station for transmission to the wireless telephone. Upon receipt of the message, the wireless telephone must once again decode the message. Hence, in existing wireless telephone system voice mail systems, a voice mail message undergoes two encoding/decoding cycles, once when the message is stored and again when the receiving person accesses his or her voice mail. Unfortunately, the quality of the voice message is degraded as an undesirable consequence of multiple encodings and decodings.

Accordingly, it is an object of the present invention to provide a voice mail system for a wireless telephone system which renders relatively high quality voice mail messages. Another object of the present invention is to provide a voice mail system for a wireless telephone system which minimizes the number of encoding/decoding cycles voice mail messages must undergo. Still another object of the present invention is to provide a voice mail system for a wireless telephone system which is easy to use and cost-effective to manufacture and implement.

SUMMARY OF THE INVENTION

In a wireless telephone system including a base station controller (BSC), a base station, and at least one wireless telephone, a computer logic device is disclosed which includes a computer logic storage device readable by a digital processing system. Instructions are embodied in the logic storage device, and the instructions are executable by the digital processing system for performing method steps for storing and relaying voice messages. As disclosed in detail below, the method steps include receiving a voice message at the BSC, wherein the voice message is intended for a called telephone. When the called telephone does not pick up, if the message is not from a wireless telephone it is encoded and then stored at the BSC. Otherwise, i.e., if the message is from another wireless telephone and consequently is already encoded, the message (after having been received and demodulated at the base station transceiver) is not decoded, and stored at the BSC.

Preferably, the method steps further include receiving a voice mail access call from an accessing telephone at the BSC. When the accessing telephone is an accessing wireless telephone in the same system as the BSC, the voice message is retrieved from storage and transmitted to the accessing wireless telephone without decoding the voice message at the BSC. Otherwise (i.e., when the accessing telephone is not in the BSC system, e.g., when the accessing telephone is a fixed telephone), the voice message is retrieved from storage, decoded at the BSC, and sent to the accessing telephone over a PSTN.

In a presently preferred embodiment, the digital modulation format is code division multiple access (CDMA) format. Additionally, the method steps further include determining whether the called telephone is a voice mail subscriber, and storing the message only when the called telephone is a voice mail subscriber. The computer logic device is also disclosed in combination with the BSC.

In another aspect, a computer-implemented method is disclosed for storing and relaying a voice message that has been generated in a wireless telephone system. The method includes determining whether the voice message should be stored, and if the voice message should be stored, storing the voice message. Then, the message is subsequently relayed to an accessing telephone for playing back of the voice message. As envisioned by the present invention, the voice message undergoes at most a single encoding/decoding cycle from when it is generated to when it is played back.

In still another aspect, a wireless telephone system includes at least one base station for receiving an incoming voice message transmitted by a sending telephone to a called telephone and for transmitting an outgoing voice message to an accessing telephone. The system includes a base station controller (BSC) that is associated with the base station. Logic means are provided at the BSC for storing the incoming voice message in speech encoded format that is compatible with the wireless communication system format when the called telephone does not pick up. Moreover, logic means at the BSC cause the voice message to be transmitted as the outgoing voice message in speech encoded format to the accessing telephone when the accessing telephone is a wireless telephone. Furthermore, logic means at the BSC decodes the voice message and then sends the voice message as the outgoing voice message to the accessing telephone when the accessing telephone is not a wireless telephone in the BSC system.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
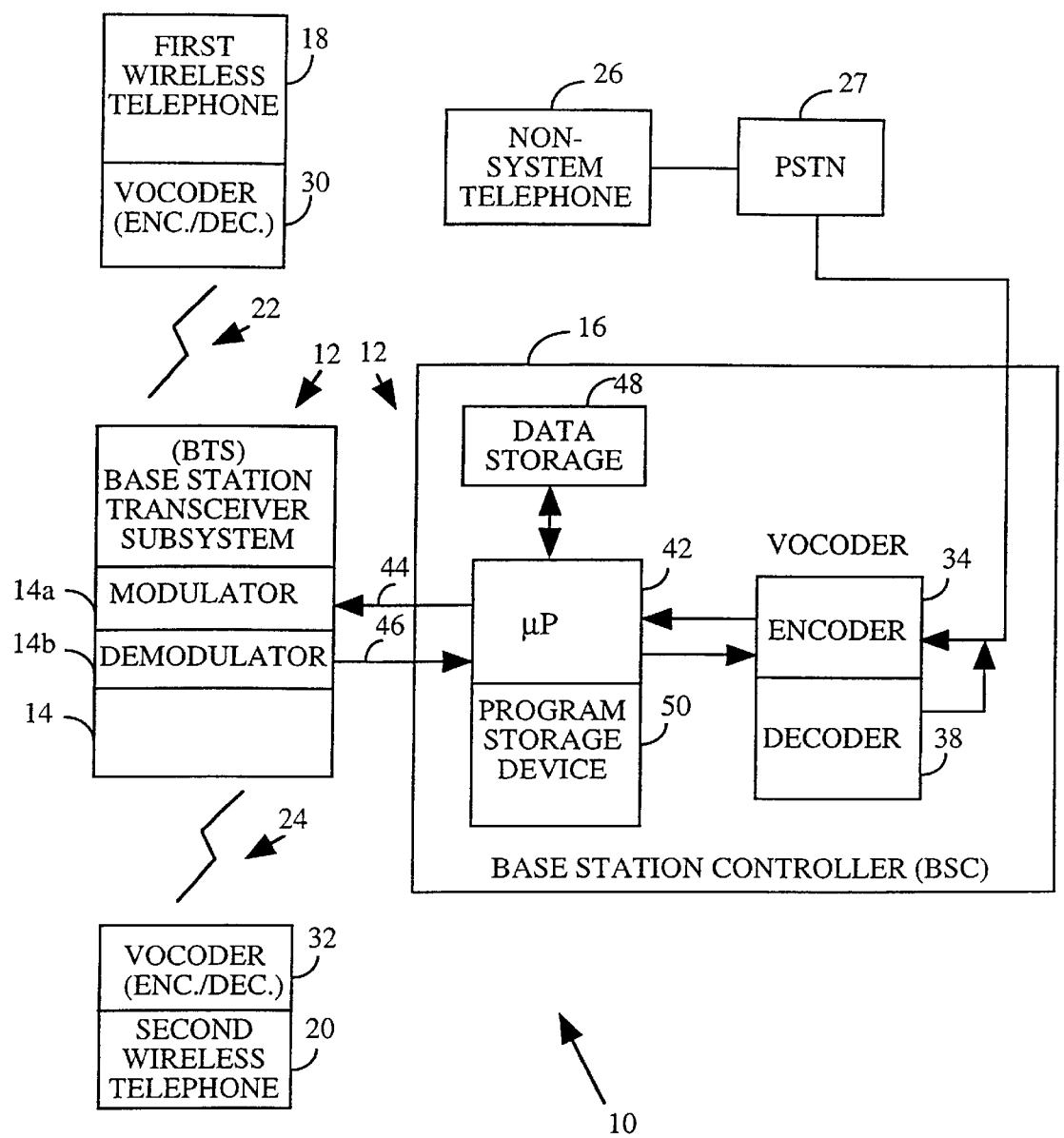
FIG. 1 is a schematic diagram of a wireless telephone system for implementing the voice message system of the present invention.

Referring initially to FIG. 1, a digital wireless telephone system is shown, generally designated 10, which includes at least one base station system, generally designated 12. As shown, the base station system 12 includes a base station transceiver subsystem (BTS) 14 and an associated base station controller (BSC) 16. In accordance with well-known principles, the BSC 16 controls plural BTS, although for clarity of disclosure only a single BTS 14 is shown in FIG. 1. The BTS 14 can communicate with at least first and second wireless telephones 18, 20 via respective wireless links 22, 24. Furthermore, the BTS 14 can communicate with one or more non-system 10 telephones, such as a conventional fixed telephone 26, via a public switch telephone network (PSTN) 27.

The BTS 14 includes a modulator 14a for modulating waveforms to be transmitted in accordance with the modulation principles of the system 10 (in the preferred embodiment, CDMA modulation principles). Similarly, the BTS 14 includes a demodulator 14b for demodulating received waveforms in accordance with the demodulation principles of the system 10.

Communication via the wireless links 22, 24 requires that messages transmitted over the links 22, 24 be encoded in digital format and modulated. Accordingly, each wireless telephone 18, 20 includes respective encoding and decoding systems 30, 32 for converting voice signals to digital format for transmission thereof to the BTS 14, and for decoding signals from the BTS 14 to voice signals. In the presently preferred embodiment, the wireless air interface digital format is code division multiple access (CDMA) format. Accordingly, the preferred system 10 is a CDMA system, details of which can be found, for example, in U.S. Pat. Nos. 4,901,307 and 5,103,459, assigned to the same assignee as is the present invention and incorporated herein by reference. In further accord with the preferred embodiment, the encoding/decoding systems 30, 32 include respective vocoders, details of preferred embodiments of which are set forth in U.S. Pat. No. 5,414,796, assigned to the same assignee as is the present invention and incorporated herein by reference.

FIG. 1 shows that the BSC 16 includes a vocoder including an encoder 34 that receives packetized pulse code modulation (PCM) signals from the PSTN 27. The encoder 34 encodes the speech signal, it being understood that messages to be transmitted are modulated by the modulator 14a in the BTS 14 after encoding as mentioned above. Also, the vocoder of the BSC 16 includes a decoder 38 that decodes demodulated CDMA signals from the demodulator 14b of the BTS 14. From the decoder 38, the signals are sent to the PSTN 27 (and, hence, the fixed telephone 26).

A microprocessor 42 communicates encoded signals to the modulator 14a of the BTS 14 via an outgoing communication link 44. Also, the microprocessor 42 receives demodulated CDMA-formatted signals from the BTS 14 via an incoming communication link 46. Further, as shown in FIG. 1 the microprocessor 42 communicates with the vocoder BSC encoder 34 and with the BSC decoder 38. Moreover, the BSC 16 includes an electronic data storage device 48 for storing data from the microprocessor 42, with the data storage device being accessible by the microprocessor 42. The data storage device 48 can be any suitable device, e.g., a solid state memory device, hard disk drive, optical drive, or tape drive.

FIG. 1 also shows that the microprocessor 42 preferably includes a program storage device 50, which includes instructions that are used by the microprocessor 42 to undertake the steps of the present invention. Accordingly, those skilled in the art will recognize that the microprocessor 42 can include a programmable central processing unit (CPU), or a programmable gate array chip, or an application specific integrated circuit (ASIC).

Figure 2:
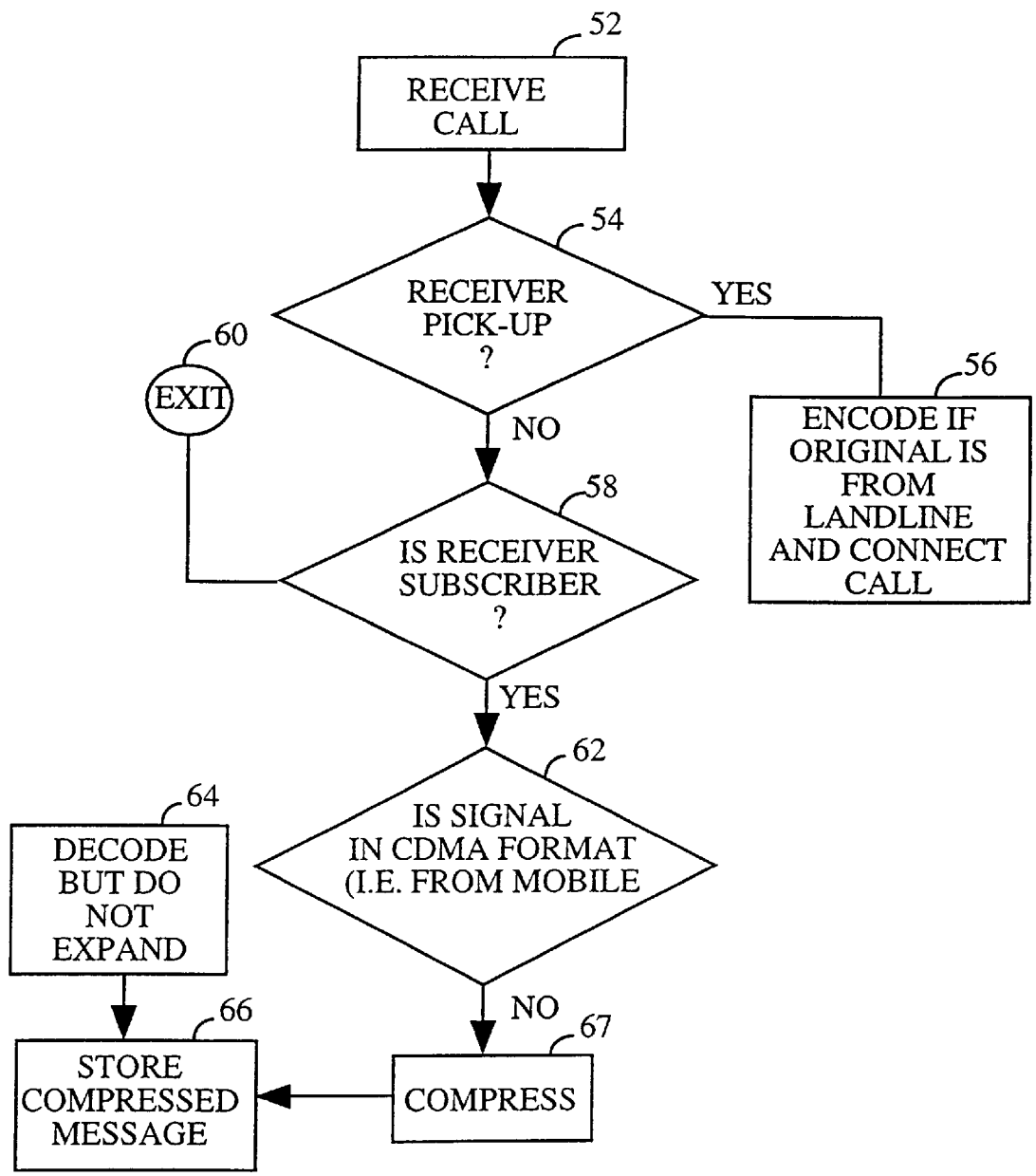
FIG. 2 is a flow chart showing the steps for receiving and storing a voice mail message.
Figure 3:
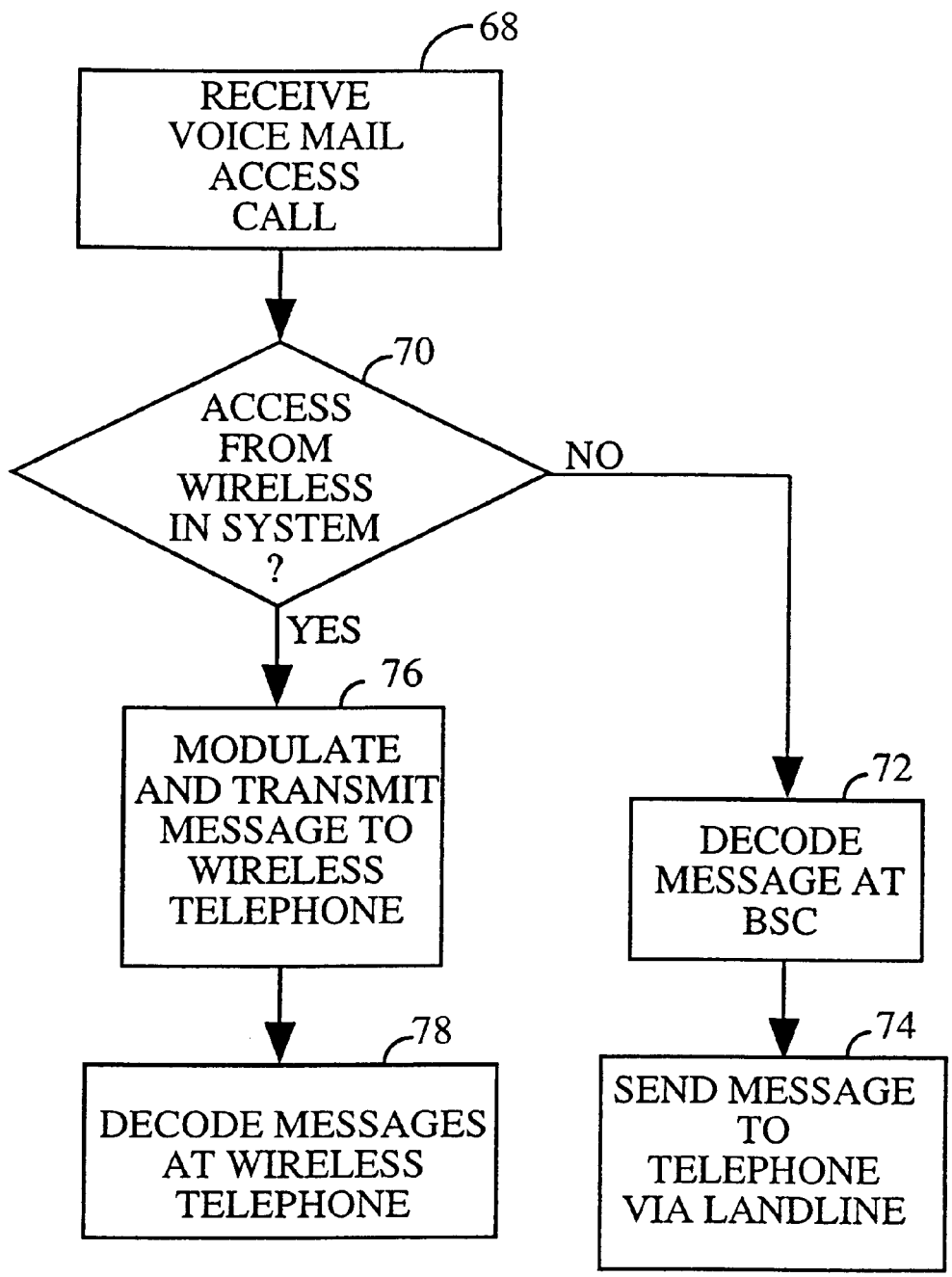
FIG. 3 is a flow chart showing the steps for retrieving and relaying voice mail messages.

FIGS. 2 and 3 illustrate the structure of the logic of the present invention as embodied in computer-readable logic structures on the storage device 50 (FIG. 1). Those skilled in the art will appreciate that the Figures illustrate the structures of logic elements that function according to this invention. Manifestly, the invention is practiced in one essential embodiment by a machine component that renders the logic elements in a form that instructs a digital processing apparatus (that is, a computer or microprocessor) to perform a sequence of operational steps corresponding to those shown in the Figures.

These instructions may reside in, i.e., be embodied by, logic structures/circuits on a data storage device including a data storage medium, such as the storage device 50 shown in FIG. 1. The machine component shown in FIG. 1 is a combination of logic elements that are embodied in the storage device 50, which advantageously can be electronic read-only memory (ROM) or electronic random access memory (RAM), or other appropriate data storage device. Alternatively, the instructions can be embodied in the form of computer program code elements on semiconductor devices, on magnetic tape, on optical disks, on a DASD array, on magnetic tape, on a conventional hard disk drive, or other appropriate data storage device.

Now referring to FIG. 2, the incoming call storage logic of the present invention can be seen. The BSC 16 receives an incoming call at block 52. The incoming call can be initiated from one of the wireless telephones 18, 20 in the system 10, in which case the incoming call is sent from the BTS 14 to the BSC 16. Or, the incoming call can be initiated from a non-system 10 telephone, such as the fixed telephone 26, in which case the call is received from the PSTN 27. The logic proceeds to decision diamond 54 to determine whether the called telephone (i.e., the "receiver") picked up.

If the called party has picked up, the logic moves to block 56 to connect the originating telephone with the called telephone after encoding the message if appropriate (i.e., when the call originated from a fixed telephone 26). On the other hand, if the called party has not picked up, the logic proceeds to decision diamond 58 to determine whether the called party is a voice mail subscriber of the BSC 16. In making this determination, the microprocessor 42 can access a subscriber list that is stored in the BSC 16. If the called party is not a voice mail subscriber of the BSC 16, the logic exits at state 60, but if the receiver has not picked up and is a voice mail subscriber, the logic proceeds to decision diamond 62.

Decision diamond 62 represents the logic branches that are followed, based on the type of telephone that initiated the call. Specifically, when the incoming call is in CDMA format and, hence, was originated from one of the wireless telephones 18, 20 in the system 10, the logic moves to block 64. At block 64, the message, having been demodulated when received by the BTS 14, is not decoded prior to storage, but instead is stored in its encoded format. Thus, at block 66 the encoded message is stored in the data storage 48 (FIG. 1). On the other hand, if the call was received from the PSTN 27, the logic moves to block 67, wherein the signal is encoded by the vocoder 35. The encoded message is then stored at block 66.

FIG. 3 shows the process by which voice mail messages are retrieved from the BSC 16. Commencing at block 68, the BSC 16 receives a voice mail access call from one of the telephones 18, 20, 26. As was the case with decision diamond 54 in FIG. 2, decision diamond 70 in FIG. 3 represents the logic branches that are followed, based on the type of telephone that initiated the access call.

When the accessing telephone is accessing via the PSTN 27, the logic moves to block 72 to retrieve the voice mail message from the data storage 48 and then to send the message to the decoder 38 of the BSC 16 to decode the message. The decoded message is then sent to the fixed telephone 26. Thus, a wireless telephone user can access his or her voice mail using a fixed telephone or other non-system 10 wireless telephone, if desired.

Alternatively, the user can access his or her voice mail using one of the wireless telephones 18, 20, in which case the logic moves from decision diamond 70 to block 76. At block 76, the encoded message is retrieved from the data storage 48, sent to the BTS 14 and modulated by the modulator 14b of the BTS 14, and then transmitted in CDMA format to the accessing wireless telephone 18, 20. At block 78, the accessing wireless telephone 18, 20 demodulates and decodes the message to a voice signal.

With the above disclosure in mind, it can now be appreciated that a call can be placed by a wireless telephone 18, 20 or a fixed telephone 26, for receipt thereof by a wireless telephone 20, 18. In the event that the called wireless telephone 20, 18 does not pick up, the call can be stored as a voice mail message at the BSC 16. Then, the user of the called wireless telephone 20, 18 can access the voice mail message from a wireless telephone 20, 18 or from a fixed telephone 26 to retrieve the message. Regardless of the type of telephone that initiated the voice mail message, and regardless of the type of telephone that retrieves the message, the message undergoes only a single encoding/decoding cycle from the time it is generated to the time it is listened to by a user, thereby improving the quality of the message, compared to voice mail systems wherein messages might undergo several encoding/decoding cycles. As used herein, the terms "encoding" and "decoding" refer to vocoding processes, i.e., the processes undertaken in a wireless telephone system to convert a voice-formatted message to a digital message and back again, using a vocoder.

While the particular INTEGRATED VOICE MAIL SYSTEM FOR CDMA NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer-implemented method for storing and relaying a voice message that has been generated in a wireless telephone system, comprising the steps of:

determining whether the voice message should be stored;

if the voice message should be stored, storing the voice message and subsequently relaying the voice message to an accessing telephone for playing back of the voice message, such that the voice message undergoes at most a single encoding decoding cycle from when it is generated to when it is played back.

2. The computer-implemented method of claim 1, wherein the voice message is intended for a called telephone, and the determining step includes:

determining whether the called telephone picks up;

when the called telephone does not pick up, determining whether the called telephone is a voice mail subscriber; and determining that the voice message should be stored when the called telephone is a voice mail subscriber.

\* \* \* \* \*